(12) United States Patent
Riley

(10) Patent No.: US 9,770,946 B2
(45) Date of Patent: Sep. 26, 2017

(54) SUPPORT CASING FOR A DIFFERENTIAL GEAR OF AN AXLE AND TRACK ROD ASSEMBLY

(71) Applicant: JC Bamford Excavators Limited, Uttoxeter, Staffordshire (GB)

(72) Inventor: Andrew John Riley, Uttoxeter (GB)

(73) Assignee: JC Bamford Excavators Limited, Uttoxeter (GB)

( * ) Notice: Subject to any disclaimer, the term of this patent is extended or adjusted under 35 U.S.C. 154(b) by 0 days.

(21) Appl. No.: 14/576,057

(22) Filed: Dec. 18, 2014

(65) Prior Publication Data

US 2015/0174958 A1 Jun. 25, 2015

(30) Foreign Application Priority Data

Dec. 20, 2013 (GB) .................................. 1322714.5

(51) Int. Cl.
*B60B 35/00* (2006.01)
*B60B 35/16* (2006.01)
*F16H 57/037* (2012.01)

(52) U.S. Cl.
CPC ............ *B60B 35/003* (2013.01); *B60B 35/16* (2013.01); *B60B 2320/10* (2013.01); *B60Y 2200/20* (2013.01); *F16H 57/037* (2013.01); *Y10T 29/4984* (2015.01)

(58) Field of Classification Search
CPC .... B60K 7/0007; B60K 35/003; B60K 17/30; B60K 7/0015; B60K 35/16; B60B 35/008; B60B 35/16
See application file for complete search history.

(56) References Cited

U.S. PATENT DOCUMENTS

| 4,775,026 A | 10/1988 | Sollbach et al. |
| 5,094,312 A | 3/1992 | Hakel |
| 5,121,808 A * | 6/1992 | Visentini ............... B60B 35/003 180/435 |
| 6,196,349 B1 | 3/2001 | DeWald et al. |
| 6,889,790 B2 * | 5/2005 | Pertusi ................... B60K 17/30 180/252 |
| 2002/0096382 A1 * | 7/2002 | Kielar .................. B62D 5/0421 180/252 |
| 2009/0200858 A1 * | 8/2009 | Iwaki ................... B60K 7/0015 303/11 |

(Continued)

FOREIGN PATENT DOCUMENTS

| CN | 102774239 A | 11/2012 |
| DE | 100 31 597 A1 | 1/2001 |
| JP | 2965258 B2 | 10/1999 |

OTHER PUBLICATIONS

Search Report for GB 1322714.5, dated Jul. 23, 2014.
Examination Report for EP 14 196 010.4, dated Sep. 29, 2016.
Search Report for EP 14 19 6010, dated Feb. 15, 2016.

*Primary Examiner* — Hau Phan
(74) *Attorney, Agent, or Firm* — Marshall, Gerstein & Borun LLP

(57) ABSTRACT

A driving and steering axle of an off-highway vehicle includes an attached track rod assembly incorporating an actuator housed in spaced apart annular mountings of an axle drive head casing. One mounting includes a slot to permit through passage of one end of the assembly with a pre-attached track rod end.

20 Claims, 3 Drawing Sheets

(56) References Cited

U.S. PATENT DOCUMENTS

2009/0283345 A1* 11/2009 Kabrick ............... B60K 7/0007
 180/65.51
2013/0333959 A1* 12/2013 Wagemann .......... B60K 7/0007
 180/62

* cited by examiner

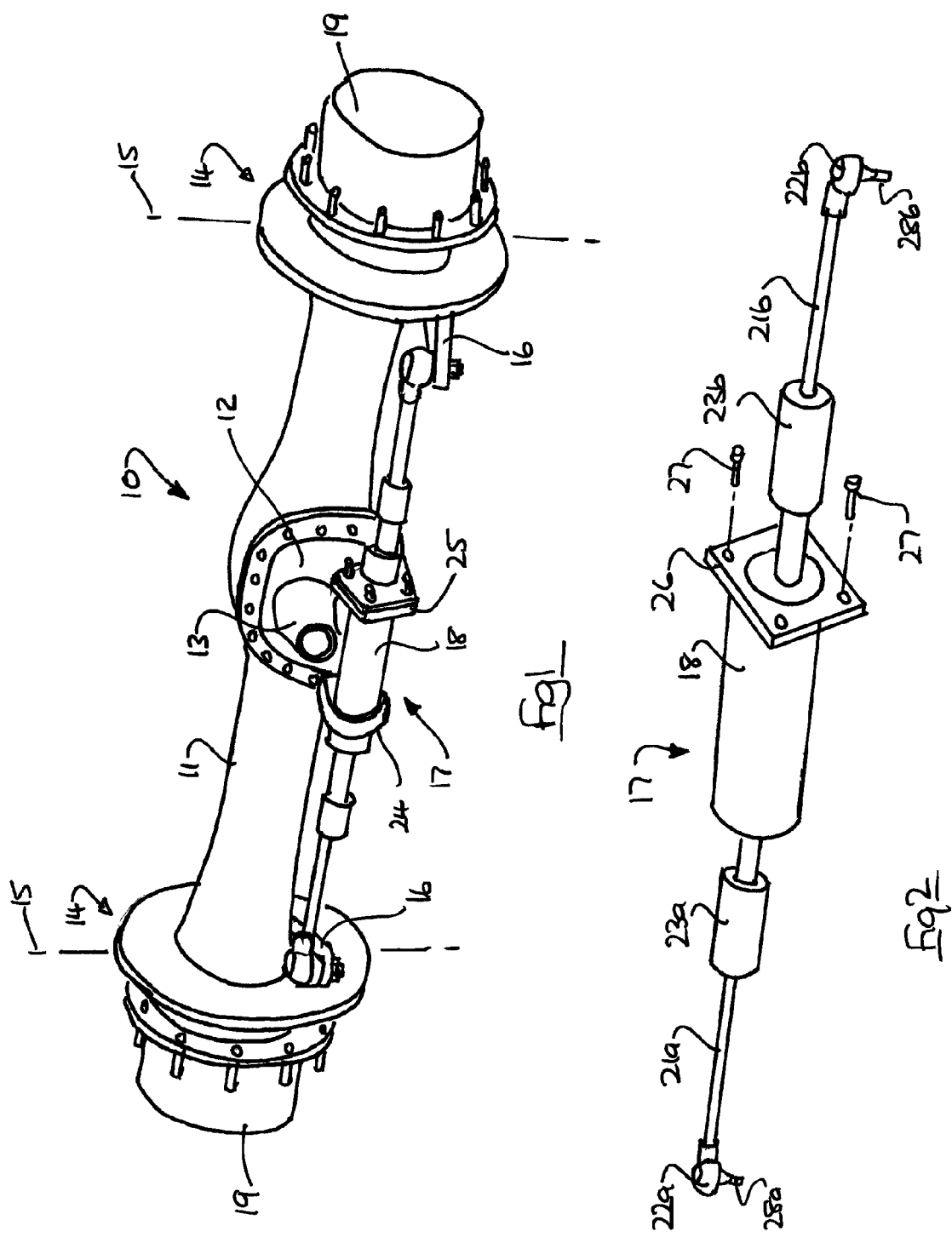

SUPPORT CASING FOR A DIFFERENTIAL GEAR OF AN AXLE AND TRACK ROD ASSEMBLY

TECHNICAL FIELD

This invention relates to a support casing for a differential gear of a driving and steering axle of a vehicle, the casing being adapted to mount a track rod assembly, and to a method of assembling a track rod assembly to such a casing.

BACKGROUND OF THE INVENTION

Some vehicles, particularly those which are used off-highway, employ a driving and steering axle; such vehicles are typically all wheel drive, and a steering axle may be at the front or at the back, or in both locations.

Necessarily a steering axle requires a track rod assembly to couple the pivotable wheel hubs of the axle, and this assembly may be connected to a conventional steering box, a steering rack, or a powered actuator responsive to movement of a steering wheel or the like.

In many off-highway vehicles, the range of wheel suspension movement is very large, and accordingly it is desirable to mount the track rod assembly, with respect to the corresponding axle, so as to avoid bump/steer effects which may occur with a track rod assembly mounted with respect to the vehicle body.

In one known arrangement a hydraulic barrel-type actuator is inserted in annular mounts of an axle, and has opposed track rods attached on the hub steering arms by conventional ball-jointed track rod ends. Such track rod ends typically comprise a female threaded body for attachment to a male threaded track rod, and a conventional taper pin for insertion through a tapered aperture of a steering arm; the taper pin includes a screw-threaded tip to receive a securing nut; the male/female attachment to the track rod may be reversed in some cases, and the taper pin may point up or down. The track rod assembly may be in front or behind the axle, with respect to the normal direction of vehicle movement.

During conventional assembly of the axle and hubs, the track rod actuator components are attached to the axle casing, and then the track rod ends are attached to the track rods before the taper pins are coupled to the respective steering arms. In a final step the threaded connection of track rod and track rod end is often adjusted to set the length of the track rod assembly, and hence the toe-in or toe-out of the wheels of the axle.

It would be desirable to provide a track rod assembly including attached track rod ends, to minimize attachment operations during vehicle assembly and to obviate delays due to problematic assembly and adjustment. However the radial extension (taper pin height) of a track rod end is typically greater than the bore of the annular mounts of the axle, so that insertion of a track rod assembly therethrough is obstructed.

SUMMARY OF THE INVENTION

According to a first aspect of the invention there is provided a support casing for the differential gear of a driving and steering axle, the casing comprising a nose defining a pinion shaft axis and support arms defining a crown-wheel axis, the casing further comprising a support mounting extending outwards therefrom from a root to a tip and in the extension direction of said nose, the support mounting being arranged to support a track rod assembly for the axle, wherein the support mounting comprises a through bore arranged to receive a cylindrical actuator, the bore having a diameter less than the radial extension of a track rod end of the track rod assembly, and the support mounting having a slot extending outwardly of said bore and arranged to allow passage of the taper pin of the track rod end, wherein the slot extends towards said root.

The arrangement of the invention permits a track rod assembly with track rod ends to be passed through the support mounting for attachment to the corresponding steering arm of one vehicle hub. Accordingly the track rod ends may be pre-assembled, and the length of the track rod assembly may be pre-set. As a result attachment and adjustment at the vehicle assembly line is simplified and the track rod assembly may be supplied as a unitary component.

In one embodiment the slot is straight, and may be 'as cast'. The slot is preferably oblique with respect to the pinion shaft axis and in one embodiment extends generally obliquely away from the operating envelope of the crown wheel and differential gear. The axle is preferably a hypoid bevel design in which the pinion axis and crown wheel axis do not coincide, but other kinds of bevel gear are possible.

The actuator of the track rod assembly may be hydraulic or electric, and typically comprises a cylindrical body within which a piston or like member reciprocates to move both track rods in unison.

In one embodiment the support casting further includes an attachment mounting extending from the casing and being spaced from said support mounting, wherein the attachment mounting has a through bore with a diameter less than the radial extent of the track rod end, and wherein the through bores of the support mounting and the attachment mounting are aligned; the through bores are substantially of the same diameter.

This arrangement gives a secure mounting for the actuator, generally at the mid-point of the axle adjacent the differential case. The actuator is preferably attached solely at the attachment mounting.

According to a second aspect of the invention there is provided a method of assembling an axle comprising the steps of:
  providing the support casing of the invention with support and attachment mountings;
  providing a track rod assembly with track rod ends;
  axially moving one end of the track rod assembly through the attachment mounting;
  orientating the track rod assembly to align the taper-pin of one track rod end with the slot of the support mounting;
  axially moving the track-rod assembly through the bore of the support mounting so that the taper-pin passes through the slot, and
  mounting said track rod assembly to said attachment mounting.

BRIEF DESCRIPTION OF THE DRAWINGS

Other features of the invention will be apparent from the appended claims, and from the following description of a preferred embodiment shown by way of example only in the accompanying drawings in which:

FIG. 1 is a schematic illustration of a known axle assembly.

FIG. 2 is a schematic illustration of a track rod assembly;

DETAILED DESCRIPTION OF THE DISCLOSURE

Figure 3:
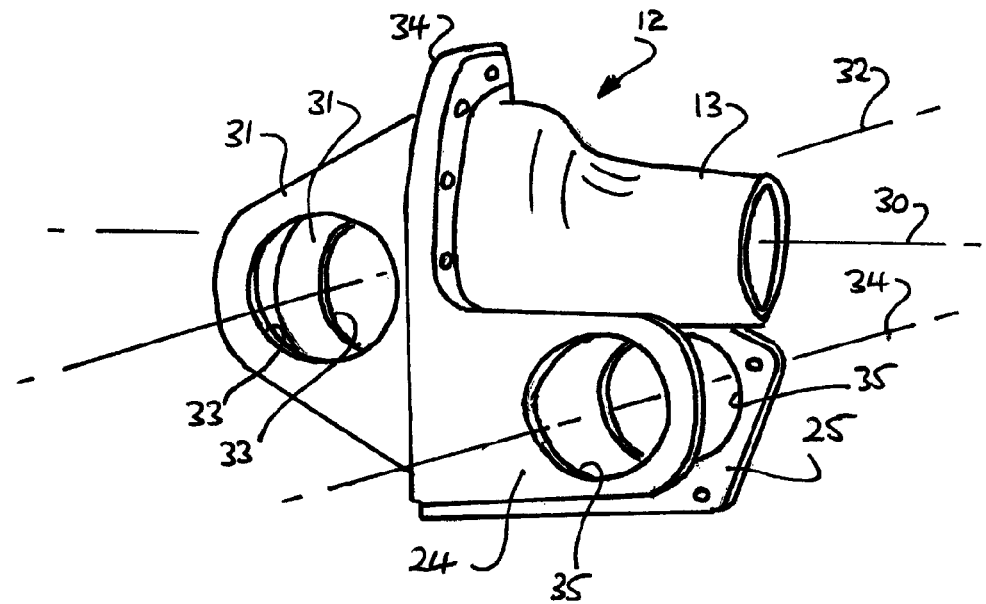
FIG. 3 is a schematic illustration of a known axle drive head casing.

With reference to the accompany drawings, FIG. 1 illustrates a driving and steering axle 10 of an off-highway construction vehicle. The axle consists of a tubular main housing 11 to which is mounted an axle drive head casing 12 having a nose 13 for supporting a driving pinion (not shown). The ends of the housing support conventional wheel hub swivels 14 mounted on substantially vertical steering axes 15. The hub swivels 14 include respective steering arms 16 connected by a track rod assembly 17, with a powered actuator 18 mounted to the drive head casing 12 as will be described below.

Within the housing is a conventional crown wheel for meshing with the driving pinion, a differential gear, and opposed side shafts for driving the wheel hubs 19.

As illustrated in FIG. 2, the track rod assembly 17 has a centrally mounted cylindrical actuator 18, which may for example be hydraulic or electric, and opposed track rods 21a, 21b which are in use reciprocated in unison to one side or the other. Each track rod generally comprises a male threaded outer end to which the female threaded socket of a respective track rod end 22a 22b is attached. The respective inner ends of the track rods include a ball joint 23a, 23b which allows articulation and relative rotation to permit adjustment of the overall length of the assembly 17.

The cylindrical body of the actuator 18 is received within close-fitting annular support and attachment mounts 24, 25, which will be further described, and is retained at one side to the attachment mount by a suitable actuator flange 26 and screws 27.

The conventional axle drive head casing 12 is illustrated in greater detail in FIG. 3 and comprises a one-piece casting, e.g. of cast iron, having a tubular nose 13 to receive a driving pinion supported by rolling element bearings on pinion axis 30. Two ears 31 of the same general shape extend oppositely to the nose 13 and define a generally orthogonal crown wheel axis 32 by means of a pair of circular bearing housings 33. A mounting flange 34 orthogonal to axis 30 has a peripheral array of holes to receive threaded fasteners of the main axle housing 11, so that the ears 31 are in use within the housing whereas the nose protrudes outwardly towards a drive or propeller shaft (not shown).

The illustrated axle is for hypoid bevel gear arrangement (the pinion and crown wheel axes are not coincident), but a spiral bevel gear arrangement is also possible.

Protruding on the nose side of the casing 12 are annular support and attachment mountings 24, 25 which are parallel to and below crown wheel axis 32, and to either side of the pinion axis 30. These mounts define an assembly axis 34 of the actuator 18, and comprise circular bores 35 of substantially the same diameter, adapted to receive the cylindrical actuator 18 in a close sliding fit. In one embodiment the bores 35 have diameters of 87 mm and 88 mm; the larger diameter ensuring free passage through the attachment mounting 25. The mountings typically are an integral part of the casting of the casing 12.

The arrangement described and illustrated in FIGS. 1-3 is conventional, and need not be described further. Upon assembly of the axle, the actuator 18 is installed from the right side (as viewed) and attached by the screws 27. The left end of the actuator (as viewed) is a close sliding fit in the mount 24. The track rods 21a, 21b may be pre-attached since they can pass through the mounts 24, 25. The track rod ends 22a, 22b are then attached to the track rods before the tapered pins 28a, 28b are attached to respective steering arms 16. The toe of the axle (determined by the length of the track rod assembly) is set by screwing the track rod ends more or less on respective track rods, and this may be done before or after connection of the pins 28a, 28b and steering arms 16.

The track rod ends 22a 22b cannot be pre-assembled because the radial extent of the pins 28a, 28b is sufficient to prevent the left-most (as viewed) from passing through both annular mounts 24.

Figure 4:
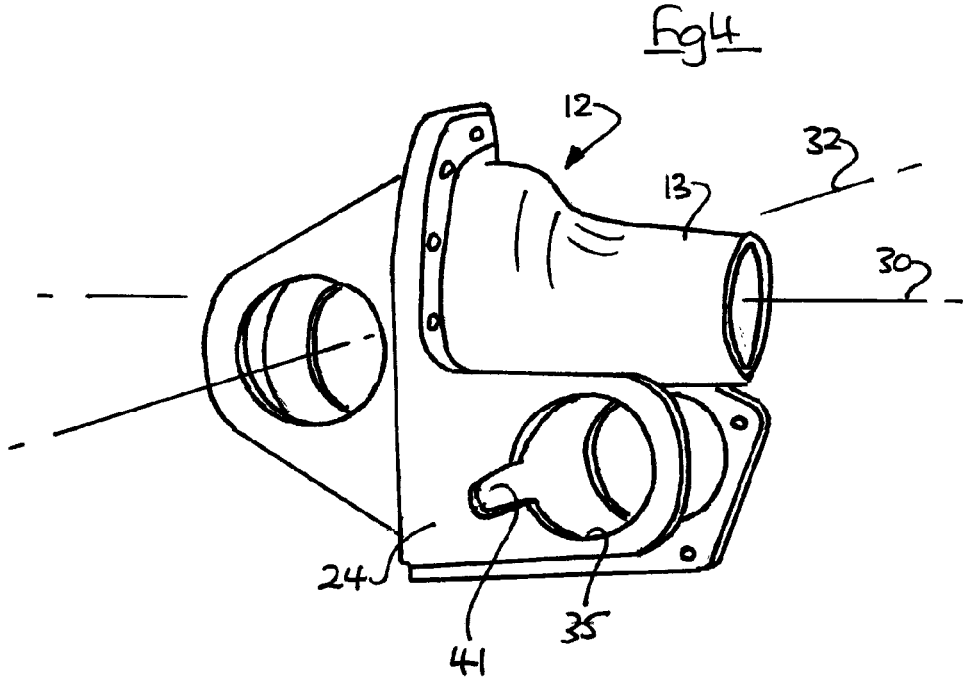
FIG. 4 corresponds to FIG. 3 and shows an axle drive head casing according to the invention.
Figure 5:
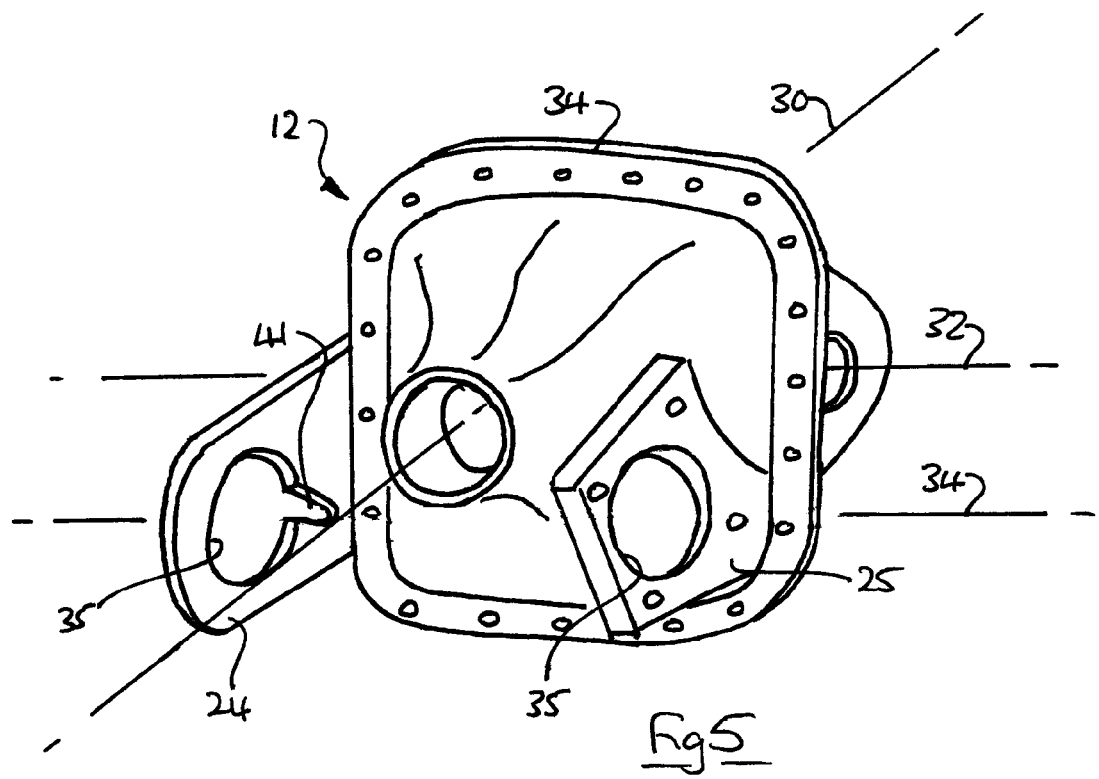
FIG. 5 shows the axle drive head casing of FIG. 4 from a different direction.
Figure 6:
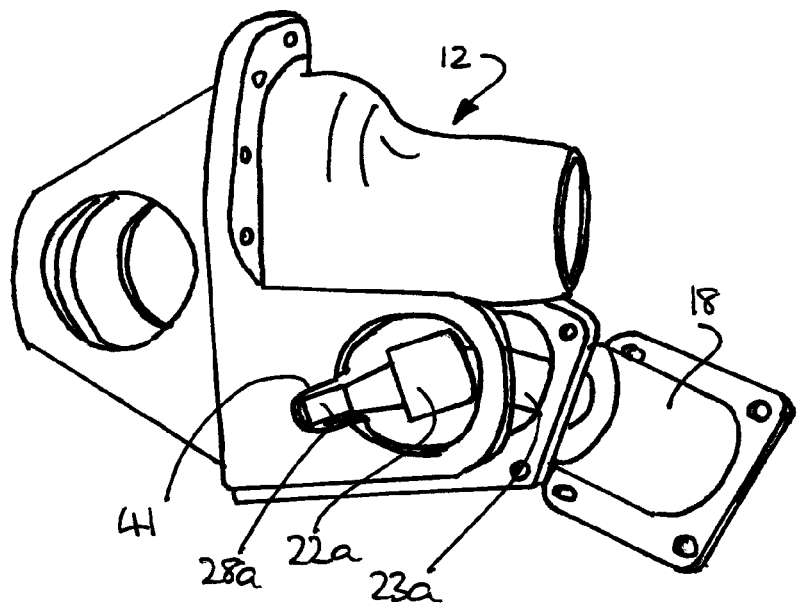
FIG. 6 shows the axle drive head casing of FIG. 4, with a track rod assembly partially installed thereon.

The invention is illustrated in FIGS. 4-6, and components common to FIGS. 1-3 carry the same reference numerals.

The drive head casing 12 of FIG. 4 is identical to that of FIG. 3 save that the annular support mount 24 includes a slot 41 directed rearwardly with respect to the nose 13, and on the side of the ears 31. In this embodiment, the slot 41 is also directed obliquely downwardly and away from the crown wheel axis 32, as illustrated, at a diverging angle in the range 10-20°.

FIG. 6 illustrates the invention in use with a partly installed track rod assembly including pre-assembled track rod ends. In particular the track rod end 22a has a pin height which exceeds the diameter of the circular bores 35. In the case of the bore of the annular mount 25, the track rod end 22a can be maneuvered therethrough by articulation of the actuator 18 and corresponding track rod 21a. However the track rod end 22a cannot be maneuvered through the bore of the annular support mount 24 because movement is constrained by the track rod and/or actuator fouling the attachment mount 25. Accordingly the slot 41 provides clearance for the taper pin 28a, thus permitting installation and connection of the actuator, and coupling of the track rod ends.

The arrangement of the invention allows a pre-assembled track rod assembly, including track rod ends, to be installed without the necessity of making separate connection of at least one track rod end on the axle or vehicle assembly line. Delay and risk of misassembly is thus mitigated, and moreover the entire track rod assembly can be completed and checked away from the assembly line. In the case of a bought-out item, the integrity of the complete track rod assembly is not compromised during installation thereof.

By placing the slot 41 in the annular support mount 24 which is not used for attaching the actuator, the strength of the actuator attachment mount 25 is not substantially compromised. Facing the slot generally in the direction of the crown wheel axis ensures that the thin outer circumference of the annular mount 24 is not weakened, nor is this portion required to be enlarged or thickened. The hoop strength of the annular mount 24 is also substantially unaffected. Pointing the slot generally downwardly (as viewed), and thus away from the pinion axis, ensures that the strength of the casing, in particular the relationship of the pinion axis and crown wheel axis, is also substantially unaffected.

It will be understood that the slot 41 should generally be close-fitting to the pin 28a, but that the size thereof will be dependent on the pin diameter and length. The slot 41 may be straight sided, but need not be. In one embodiment the slot is 'as cast' so that additional machining of the annular support mount 24 is not required. A minor advantage of the slot 24 is a reduction in mass of the casing 12, and in the cost of manufacture thereof. A significant advantage is that the axle drive head casing is substantially identical to the prior art component, and can thus be manufactured and machined in an identical manner. The size and shape of the slot 41 can be adjusted, if required, to suit different sizes of track rod end, and may of course be a machined surface if desired.

The invention has been described in relation to an axle drive head casing, but it will be appreciated that it is applicable to any separable part of a differential case of an axle assembly, or directly to a differential case or directly to a main axle housing. Also it will be understood that the bore of the attachment mount 25 may be a little larger than the bore of the support mount 24 if the actuator is stepped outwardly towards the mounting flange.

The invention claimed is:

1. A support casing for a differential gear of a driving and steering axle, the casing comprising a nose defining a pinion shaft axis and support arms defining a crown-wheel axis, the nose extending in a first direction, the casing further comprising a support mounting extending outward therefrom from a first end to a second end and in the first direction, the support mounting being arranged to support a track rod assembly for the axle, wherein the support mounting comprises a through bore arranged to receive a cylindrical actuator of the track rod assembly, the through bore having a diameter less than a radial extent of a track rod end of the track rod assembly, and the support mounting having a slot extending outwardly of said through bore and sized to allow the track rod end to be passed through the support mounting, wherein the slot extends towards said first end.

2. The support casing according to claim 1 wherein said slot is substantially straight.

3. The support casing of claim 2 wherein said slot extends in a direction that is non-parallel with said pinion shaft axis.

4. The support casing of claim 3 wherein said slot extends in a direction that is oblique to said pinion shaft axis.

5. The support casing of claim 4 wherein the slot has a closed end and an open end, the open end being closer to the pinion shaft axis than the closed end.

6. The support casing of claim 1 wherein said support mounting is substantially planar and extends in the direction of said pinion shaft axis.

7. The support casing of claim 6 wherein a plane is defined by said pinion shaft axis, said plane being parallel to said crown wheel axis, and said support mounting being substantially orthogonal to said plane.

8. The support casing of claim 1 further comprising an attachment mounting extending from the casing and being spaced from said support mounting, wherein said attachment mounting has a through bore with a diameter less than the radial extent of the track rod end of the track rod assembly, and wherein said through bores of said support mounting and said attachment mounting are aligned with one another.

9. The support casing of claim 8 wherein said attachment mounting is substantially planar.

10. The support casing of claim 8 wherein the said through bores are of substantially the same diameter.

11. The support casing of claim 8 wherein said through bores are for a close sliding fit with the cylindrical body of the cylindrical actuator.

12. The support casing of claim 8 wherein said attachment mounting is adapted for attachment to a flange of the cylindrical actuator.

13. The support casing of claim 12 wherein the attachment side of said flange is opposite to said support mounting.

14. The support casing of claim 8 wherein said through bores define an actuator axis parallel to said crown wheel axis.

15. The support casing of claim 14 wherein said support mounting and said attachment mounting lie in parallel planes on either side of said pinion shaft axis.

16. A method of assembling an axle comprising the steps of:
    providing the support casing of claim 8 providing a track rod assembly with pre-attached track rod ends having a radial extent greater than a diameter of each of the through bores of the support mounting and the attachment mounting;
    axially moving one end of the track rod assembly through said attachment mounting;
    orienting the track rod assembly to align a taper-pin of one of the pre-attached track rod ends with said slot;
    axially moving the track rod assembly through the through bore of the support mounting so that the taper-pin passes through the slot, and
    mounting said track rod assembly to said attachment mounting.

17. The support casing of claim 1, and further including a pinion on the pinion shaft axis, and a crown wheel on the crown wheel axis.

18. The support casing of claim 1, wherein the slot is a blind slot.

19. An axle comprising:
    the support casing of claim 1, the axle further including a track rod assembly comprising a cylindrical hydraulic actuator, opposed track rods and respective track rod ends pre-attached to the opposed track rods and each having a taper pin extending therefrom in a direction substantially radially from an axis of the respective track rod,
    wherein the track rod assembly is adapted for mounting to the support casing by passing one of the pre-attached track rod ends through the support mounting by passing the taper pin through said slot.

20. An off-highway vehicle comprising: the axle of claim 19.

* * * * *